United States Patent [19]

Basu

[11] 4,423,125
[45] Dec. 27, 1983

[54] AMBIENT TEMPERATURE RECHARGEABLE BATTERY

[75] Inventor: Samar Basu, Somerset, N.J.

[73] Assignee: Bell Telephone Laboratories, Incorporated, Murray Hill, N.J.

[21] Appl. No.: 416,968

[22] Filed: Sep. 13, 1982

[51] Int. Cl.³ .............................................. H01M 6/14
[52] U.S. Cl. .................................... 429/194; 429/218
[58] Field of Search ............... 429/194, 195, 197, 218

[56] References Cited

U.S. PATENT DOCUMENTS 4,035,555  7/1977  Murphy et al. ...................... 429/194
4,041,220  8/1977  Armand ........................... 429/194 X
4,304,825 12/1981  Basu ................................... 429/103

OTHER PUBLICATIONS

Carbon, vol. 16, 1978, pp. 211–212.
Materials Science and Engineering, vol. 38, 1979, pp. 275–283.

Primary Examiner—Charles F. LeFevour
Attorney, Agent, or Firm—Lester H. Birnbaum

[57] ABSTRACT

A secondary lithium battery system which operates at ambient temperatures. The battery includes an organic solvent for an electrolyte, a conventional cathode, and an intercalation compound for an anode. Such batteries maintain high capacities after numerous discharge-charge cycles.

7 Claims, 1 Drawing Figure

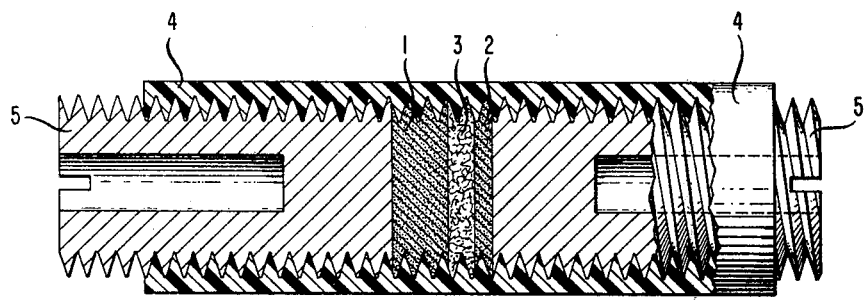

AMBIENT TEMPERATURE RECHARGEABLE BATTERY

BACKGROUND OF THE INVENTION

This invention relates to ambient temperature rechargeable lithium battery systems.

Rechargeable lithium batteries are useful in many applications because of their high battery voltage and high capacity per unit weight and volume. U.S. Pat. No. 4,304,825 issued to Basu describes a battery which has a conventional positive electrode, a molten salt electrolyte and a negative electrode comprising lithium intercalated graphite. This type of battery structure has proven to be very effective in many applications which involve high temperature operation. However, it is desired in many cases to have a battery that can operate at ambient temperature and still exhibit a high battery voltage and high capacity per unit weight and volume.

Secondary (rechargeable) lithium batteries which operate at ambient temperature typically include a lithium anode, an organic electrolyte and a cathode. This type of battery structure is generally known from U.S. Pat. No. 4,035,555 issued July 12, 1977 to D. W. Murphy and F. A. Trumbore. Such a battery cell exhibits a high capacity per unit weight and volume as well as extensive rechargeability. However, the lithium anode in such a structure may undergo a slow chemical change thereby limiting the battery's cycle life. For many commercial applications employing rechargeable batteries, a battery which can withstand an ever greater number of discharge-charge cycles is desired.

Accordingly, it is a primary objective of the present invention to provide a rechargeable lithium battery which can maintain a high capacity after many discharge-charge cycles.

SUMMARY OF THE INVENTION

This and other objects are achieved in accordance with the present invention which is a rechargeable battery comprising an organic electrolyte, an anode comprising lithium intercalated graphite as its active material, and a cathode.

BRIEF DESCRIPTION OF THE DRAWING

These and other features of the invention are delineated in detail in the following description. In the drawing:

The FIGURE is a cross-sectional view of a screw-in type battery in accordance with one embodiment of the invention.

DETAILED DESCRIPTION

The secondary lithium battery of the present invention is illustrated here in a screw-in type battery. However it is apparent that the materials employed here can be utilized in other battery structures.

The present invention makes use of lithium intercalated graphite in the anode of an ambient temperature secondary (rechargeable) battery. Graphite intercalation compounds of lithium consist of alternating sequences of one or more hexagonal carbon layers separated by a layer of lithium atoms. A wide variety of procedures may be used to prepare a lithium-graphite anode. Methods of forming lithium intercalated graphite, and in particular $LiC_6$, have been outlined in several references including "Synthesis and Properties of Lithium-Graphite Intercalation Compounds" by S. Basu et al, *Materials Science and Engineering*, Vol. 38 (1979), pp. 275-283 and "Alternate Synthesis and Reflectivity Spectrum of Stage 1 Lithium-Graphite Intercalation Compound" by M. Zanini et al, *Carbon*, Vol. 16 (1978), pp. 211-212. The ratio of lithium to graphite in an intercalation compound may vary over a broad range (i.e. $LiC_6$, $LiC_{12}$, $LiC_{18}$, etc.). However, it is best to combine the two in such a way as to form an intercalation compound with the highest possible Li:C ratio, that being $LiC_6$. This yields maximum capacity as well as extensive rechargeability.

In this example, polycrystalline stage I lithium intercalated graphite (corresponding to one carbon layer between each lithium layer) was prepared by the standard liquid phase intercalation technique. Rods of high purity polycrystalline graphite were degassed at about 400 degrees C. and $10^{-3}$ Torr and were transferred into a controlled atmosphere glove box having a circulating flow of purified argon and a moisture level of approximately 1 ppm $H_2O$. The graphite was immersed in a 304 stainless steel crucible within the box containing molten Li (99.9%) at 350±5 degrees C. In about 18-24 hours lithium intercalation into graphite was completed and the rods of $LiC_6$ were withdrawn from the melt and excess lithium was removed by scraping.

Referring now to FIG. 1, an anode (1) which was ⅜" in diameter and 3/16" long was pressed from crushed $LiC_6$. A ⅜" diameter cathode (2), having a length of 1/16" was pressed from niobium triselenide ($NbSe_3$). A 2 molar solution of $LiAsF_6$ dissolved in 1,3 dioxolane was used as an electrolyte. A piece of fiberglass (3) measuring ⅜" diameter and ¼" long was soaked with the electrolyte and placed between the anode and the cathode to act as a separator. For convenience in constructing a lab model, a Halar casing (4) (trademark of Allied Chemical Corporation) was used to surround the battery and screws (5) kept the electrodes in place. Current was collected by plugs inserted in the holes in the screws (not shown). The resulting structure has been found to operate efficiently at room temperature. However, it is expected to operate at temperatures 15-20 degrees C. above and below room temperature as well (i.e., a temperature of 10-45 degrees C. is preferred, but the battery may operate in the range 0-60 degrees C.).

When a load is connected to the anode (1) and the cathode (2), a discharge current begins to flow through the battery and the load. It is hypothesized that $Li^+$ ions are freed from the $LiC_6$ lattice in the anode (1) and are conducted by the electrolyte across the fiberglass separator (3) to the cathode (2). The ions then react with the cathode (2) as described by the reaction: $Li^+ + NbSe_3 \rightarrow Li_xNbSe_3$, where $0 \leq x \leq 3$, depending on the degree to which the battery has discharged. Once all the lithium in the anode (1) has been conducted to the cathode (2) or the cathode has reached its maximum capacity of lithium (i.e., x=3), the battery reaches the end of its discharge life. It is recharged by reversing the current flow within the battery. It is believed that the $Li^+$ ion is then formed from the $Li_xNbSe_3$ cathode and conducted back to the anode where it is reintroduced into the graphite lattice to form lithium intercalated graphite.

From this battery system one cycle might be summarized by the following mechanism: discharge discharge
(anode) $LiC_6 \xrightarrow{current} Li^+ + LiC_y$ (y = 12, 18, etc.)

(cathode) $Li^+ + NbSe_3 \longrightarrow Li_xNbSe_3$  $0 \leq x \leq 3$ charge charge
(cathode) $Li_xNbSe_3 \xrightarrow{current} Li^+ + NbSe_3$ (anode) $Li^+ + LiC_y \longrightarrow LiC_6$ It will be noted that the anode reaction during discharge will generally leave behind some mixture of higher stage intercalation compounds. It will also be noted that since lithium exists as lithium ion, $Li^+$, within the $LiC_6$ lattice, elemental lithium is unlikely to form on the anode surface at moderate charging rates. Such freshly reduced elemental lithium on an anode surface tends to be highly reactive with organic electrolyte solvents which are typically used in lithium batteries. Such side reactions lead to the loss of lithium from the anode and can cause ultimate cell failure. Thus, by substantially reducing their presence, one can increase the rechargeability of such a battery.

The discharge in this type of battery is completed when either of two things happen:

(1) When all the Li in the anode has been conducted across the electrolyte to the cathode; or (2) When all the $NbSe_3$ in the cathode has been changed to $Li_3NbSe_3$. The first of these two cases is referred to as being anode limited and the second is referred to as being cathode limited. Since Li is likely to be lost from the system due to side reactions, it is usually best to have an excess of lithium within a battery system, thereby making the battery cathode limited. Further, although the anode described here was essentially 100 percent $LiC_6$, this is not an essential condition. For example, in addition to $LiC_6$ an anode could comprise alloys of lithium, higher stage intercalation compounds or elemental lithium. It is expected that the benefits of the invention could be achieved with an anode which comprises at least 5 percent $LiC_6$.

Although the invention here has been described in terms of a screw-in type battery, it should be apparent that it is applicable to any secondary battery structure. Further, although the lithium intercalated graphite anode was presented here in conjunction with a $NbSe_3$ cathode and an electrolyte comprising $LiAsF_6$ in dioxolane, other cathode and electrolyte materials can be used with this anode. Possible electrolyte salts might include LiI, LiBr and $LiPF_6$. Possible cathodes include $V_6O_{13}$, $TiS_2$, and $V(Cr,Fe)S_2$. The choice of solvent is particularly important since most react with the $LiC_6$ anode. It was discovered that the particular solvent specified herein (1,3 dioxolane) was stable in the lithium intercalated graphite system. Other stable solvents may be discovered.

Various additional modifications of the invention will become apparent to those skilled in the art. All such variations which basically rely on the teachings through which the invention has advanced the art are properly considered within the spirit and scope of the invention.

What is claimed is:

1. A rechargeable battery comprising an organic solvent containing a solute as the electrolyte, an anode comprising lithium intercalated graphite as its active material, and a cathode.

2. A device according to claim 1, wherein said organic electrolyte comprises 1,3 dioxolane as a solvent.

3. A device according to claim 2, wherein said electrolyte further comprises $LiAsF_6$.

4. A device according to claim 1, wherein said cathode comprises niobium triselenide.

5. A device according to claim 1 which operates within a temperature range from 0 degrees C. to 60 degrees C.

6. A device according to claim 1 wherein the anode comprises $LiC_6$.

7. A secondary ambient temperature lithium battery comprising the following components: an $LiAsF_6$ electrolyte dissolved in 1,3 dioxolane; a cathode including $NbSe_3$; and an anode consisting essentially of $LiC_6$.

* * * * *